United States Patent [19]

James et al.

[11] Patent Number: 5,864,844
[45] Date of Patent: Jan. 26, 1999

[54] SYSTEM AND METHOD FOR ENHANCING A USER INTERFACE WITH A COMPUTER BASED TRAINING TOOL

[75] Inventors: Arthur James, San Jose; Catherine Anne Abbott, Campbell; Michael Andrew Arent, Albany; Gregory J. Czora, Cupertino; James M. Laffey, Sunnyvale; William W. Luciw, Morgan Hill; Mark Leslie Miller, San Carlos; Daniel E. Rose, Cupertino; James Clinton Spohrer, Santa Clara; James Reginald Winkles, Stanford, all of Calif.

[73] Assignee: Apple Computer, Inc., Cupertino, Calif.

[21] Appl. No.: 738,463

[22] Filed: Oct. 24, 1996

Related U.S. Application Data

[63] Continuation of Ser. No. 340,791, Nov. 11, 1994, abandoned, which is a continuation of Ser. No. 19,240, Feb. 18, 1993, abandoned.

[51] Int. Cl.[6] .................................................. G06F 19/00
[52] U.S. Cl. ............................... 707/4; 704/9; 345/352; 434/167
[58] Field of Search .......................... 434/167; 395/604, 395/353; 704/9; 707/4; 345/352

[56] References Cited

U.S. PATENT DOCUMENTS

| | | | |
|---|---|---|---|
| 4,688,195 | 8/1987 | Thompson et al. | 706/11 |
| 4,829,423 | 5/1989 | Tennant et al. | 704/8 |
| 4,931,926 | 6/1990 | Tanaka et al. | 704/8 |
| 4,931,935 | 6/1990 | Ohira et al. | 704/8 |
| 4,994,967 | 2/1991 | Asakawa | 704/9 |
| 5,255,386 | 10/1993 | Prayer | 707/5 |
| 5,263,167 | 11/1993 | Conner, Jr. et al. | 707/4 |

OTHER PUBLICATIONS

Arthur James and Jim Winkles, "Role'm—A role–play simulation," Jul. 27, 1993, pp. 1–37.
Frederich N. Tou, et al., "Rabbit; An Intelligent Database Assistant", Aug. 1982, pp. 314–318.
James C. Spohrer, et al., "A Role Playing Simulator for Needs Analysis Consultations", 1991.
Scott M. Stevens, "Intelligent Interactive Video Simulation of a Code Inspection", Communications of the ACM, Jul. 1989, vol. 32, No. 7, pp. 832–843.
Harry R. Tennant, et al., "Menu–Based Natural Language Understanding", 1983, pp. 151–158.

*Primary Examiner*—Kenneth S. Kim
*Attorney, Agent, or Firm*—Carr & Ferrell LLP

[57] ABSTRACT

A method for enhancing a user interface with a computer based training tool comprising the steps of listing domain objects on a display; listing domain object values in response to a selection of one of the domain objects; generating a plurality of inquiries in response to a user selection of one of the domain object values; replying with a predetermined answer; identifying a new domain object value in the predetermined answer; and adding to the plurality of inquiries a new inquiry which incorporates both the selected domain object value and the new domain object value.

3 Claims, 18 Drawing Sheets

SYSTEM AND METHOD FOR ENHANCING A USER INTERFACE WITH A COMPUTER BASED TRAINING TOOL

This application is a continuation of application Ser. No. 08/340,791, filed Nov. 11, 1994, now abandoned which is a continuation of application Ser. No. 08/019,240, filed Feb. 18, 1993, now abandoned.

FIELD OF THE INVENTION

This invention generally relates to the formation of a composite system for information exchange, and more particularly, to the configuration of a composite system by linkage of a dialogue system for dialogue exchange with an alternate system.

BACKGROUND OF THE INVENTION

The need for technological solutions to learning is abundant. In particular, there exists an unfulfilled need for an intelligent and interactive interface system that is able to respond to user inquiries as well as partake in role playing simulations.

Role play simulation involves a simulation in which a user of a computer system interacts with an alternate system. The alternate system accepts and responds to the user with natural language in a manner consistent with how an actual human might behave. Hence, role play simulation provides users with a method enhancing interpersonal skills by engaging in conversations in a real context.

The need for role play simulation as an educational tool follows from showings that role playing is an effective technique for teaching interactive skills as well as a substitute for skills gained through experience. Role playing in classrooms is often ineffective, however, because of the inability to realistically capture the essence of a simulation and the inability to give precise feedback.

Tangential attempts have been made to satisfy such a demand through the formulation of computerized information systems which respond to inquiries made in natural language. The primary application for natural language interfaces has been to natural language database query systems. For all natural language systems, the user has been required to type his question into the keyboard of a computer terminal. When the entire question had been input, the natural language interface attempts to process an input query, or otherwise respond that the query was not understood.

Natural language information retrieval systems are provided with a semantic analysis unit for processing natural language. The semantic analysis unit is designed so as to understand the semantics of an inquiry sentence inputted in a natural language, produce retrieval conditions, and ultimately carry out an information retrieval.

In order for the semantic analysis unit of the system to understand the semantics of words contained within an inquiry sentence, it is required to collate a word with a dictionary and carry out a semantic analysis. It is, however, impossible to register all words, which might be contained in a great variety of inquiry sentences, within a dictionary. Therefore, it follows that a portion of the words within the inquiry sentence, such as an undefined word, are not capable of being collated.

Tennant (1980) performed the first and only extensive evaluation of a natural language interface. S This evaluation was performed for the PLANES system, a natural language database query system that accessed a military aircraft maintenance database in natural language. The results of this evaluation show quite clearly why natural language interfaces are not in common use today. About one-third of the queries input to the system by users were incomprehensible by the system, even though the problems assigned these users were specifically designed to correspond with relatively straightforward queries.

Although research into the construction of natural language interfaces has gone on for a number of years, resulting in the construction of many prototype systems, natural language interfaces are not in common use today. One reason for this is that the natural language interfaces that have been constructed to date are overly complex to construct and quite difficult to utilize. Another reason is because all systems that are constructed have many limitations in coverage. That is, the constructed systems can only understand a small subset of all possible natural language queries. A natural language system which can understand all, or even a substantial part of a language, is currently not feasible.

A further reason why natural language interfaces are not in common use today is the large amount of time it has traditionally taken to construct a natural language interface. Current technology is such that each natural language interface must be constructed on a case by case basis for each application. Efforts taking from ten to thirty man years per application are not uncommon. Thus, only applications that can justify such a large expenditure of manpower are candidates for possible applications. However, given the quality of the system that results, the effort has not proven to be worthwhile.

Natural language interfaces that have been constructed employ a grammar which characterizes the class of acceptable input strings. A parser then accesses this grammar to produce a parse tree (or parse trees for an ambiguous input) for the input string. This parse tree is then translated into an expression (or set of expressions) which represents the meaning of an input string and which is interpretable by the computer system for which the natural language interface has been built. A wide variety of intricate grammar formalisms and parsing algorithms have been utilized in such interfaces.

Most grammar formalisms can, however, be classified under the general heading of augmented context-free grammars. Augmented context-free grammars are basic grammar rules of a context-free grammar where each context-free rule has, associated with it, augmentations which give the grammar added power. These augmentations generally access attributes (and sometimes values) of the nodes of the context-free rules.

Linguistic theories based on this class of grammars are those of Gazdar (1982), Bresnan and Kaplan (see Kaplan and Bresnan, 1981 and Bresnan, 1982), and Ross and Saenz (see Ross, 1981 and Saenz, 1982). Parsers for constructing natural language interfaces which utilize grammars of this general class are the DIAMOND Parser developed at SRI (see J. Robinson, 1980), the GPSG Parser developed at HP (see Gawron, King, Lamping, Loebner, Paulson, Pullum, Sag, and Wasow, 1982) and many others. Note that this description is neutral between syntactically-based and semantically-based grammars. In general, these frameworks are adequate for characterizing both classes of grammars.

Natural language parsers are generally based on one of several parsing algorithms that have been employed for parsing context-free grammars (for example, see Earley, 1980, Younger, 1967, Griffiths and Petrick, 1965, and Ross, 1981). First, a context-free parse is performed. Then, the augmentation rules are used. In some systems, a partial context-free parse is initially undertaken. Thereafter, augmentations which are relevant to that portion of the parse are undertaken. This procedure is then iterated until a complete parse is found.

A notable exception to this general trend is the TAQ System that has been under development for the past ten years at IBM (see Plath, 1975 and Petrick, 1973). It is based on the theory of transformational grammar (see Chomsky, 1965) and it employs, as grammar rules, several hundred inverse transformations. A transformational parser applies relevant transformations to yield a set of parse trees.

Because of the numerous problems associated with natural language systems, a number of alternative "restricted natural language systems" have been developed. Restricted natural language systems allow a user to select inquiry sentences. The selected inquiry sentence is then always capable of being interpretable and processed by the underlying system.

U.S. Pat. No. 4,829,423, issued to Tennant et. al., is an example of a restricted natural language system. The Tennant patent discloses a system employing diverse menus from which an inquiry is formulated from beginning to end. At any point in the construction of an inquiry, only a subset of the menus is active. That is, only those menus containing words which are determined to be likely continuations of immediately previously selected words are displayed for selection.

Valid continuations are determined by a parser which uses a predefined grammar to determine which words are valid continuations from a previously selected word, and whether a complete inquiry sentence has been entered. The disclosed system does not, however, preclude the formation of ambiguous inquiries.

Current restricted natural language systems, such as the menu-based system disclosed in the Tennant patent, require a user to undertake a complex and ineffective process in order to formulate an inquiry. Specifically, current restricted natural language systems construct an inquiry sentence from left to right. Unfortunately, the initial words of a sentence may be highly variable, unrelated to the final content of the sentence, or dependent upon the latter words of the inquiry. Moreover, such systems do not protect against ambiguous inquiries. Thus, the prior art that the applicant is aware of provides an interface that is overly complex and ineffective for formulating typical inquiry sentences.

SUMMARY OF THE INVENTION

The present invention overcomes the aforementioned deficiencies of the prior art by providing a composite system where inquiries are formulated within a dialogue system and thereafter submitted to an alternate system. The alternate system, being linked to the dialogue system, then responds accordingly to the submitted inquiry.

The dialogue system possesses an interface that is topically organized. Thus, a user is not required to type a well formulated input to a natural language system. Rather, the user is presented with a set of topically related objects from which a set of potential inquiries is generated. In particular, the dialogue system comprises an interface which presents a series of domain objects. Selection of an object value of a particular domain object yields a set of potential inquiries. Each of the yielded inquiries relates to the selected object value. Upon selection and submittal of an inquiry, a response to the inquiry is given by the alternate system.

The linkage of diverse alternate systems and the dialogue system provides a user with expanded information access capabilities. Alternate systems that can be used within the composite system include simulation systems, databases, expert systems, information retrieval systems, and other systems which involve user interaction with a computer. The present invention thus provides users with a uniform and efficient method for selecting a desired inquiry from a large number of inquiries that an alternate system is capable of processing.

DETAILED DESCRIPTION OF THE INVENTION

The present invention is a composite system in which a dialogue system is linked with an alternate system. The linkage allows for the dialogue system to submit a selected inquiry to the alternate system. In turn, the alternate system forwards a response to the submitted inquiry to the dialogue system for display upon the dialogue system interface.

COMPUTER SYSTEM

Figure 1:
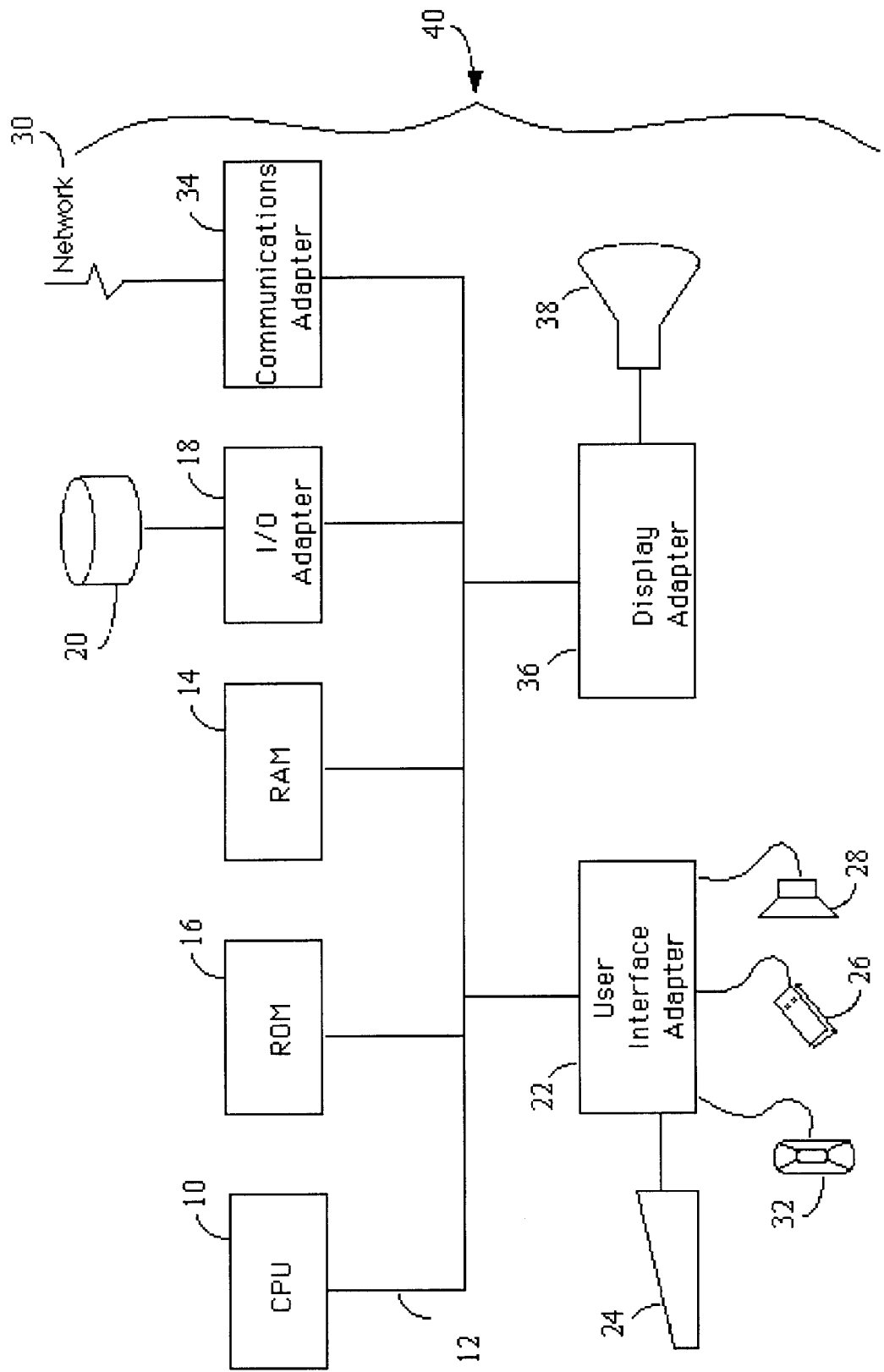
FIG. 1 is a block diagram of a computer system in accordance with the present invention.

A representative hardware environment is depicted in FIG. 1, which illustrates a suitable hardware configuration of a workstation 40 in accordance with the present invention. The workstation 40 has a central processing unit 10, such as a conventional microprocessor, and a number of other units interconnected via a system bus 12. The illustrated workstation 40 shown in FIG. 1 includes a Random Access Memory 14 (RAM), a Read Only Memory 16 (ROM), an I/O adapter 18 for connecting peripheral devices such as disk units 20 to the bus 12, a user interface adapter 22 for connecting a keyboard 24, a mouse 26, a speaker 28, a microphone 32, and/or other user interface devices such as a touch screen device (not shown) to the bus 12. The workstation 40 may also have a communications adapter 34 for connecting the workstation 40 to a data processing network 30 and a display adapted 36 for connecting the bus 12 to a display device 38.

ALTERNATE SYSTEM

The present invention provides a composite system that passes information between a dialogue system and an alternate system. Types of alternate systems specifically include: (i) a simulation system; (ii) a database; (iii) an information retrieval system; and (iv) an expert system. In addition to such specific systems, an alternate system can comprise any system that requires user interaction with a computer.

A simulation system forms a computerized model of certain features of a physical or logical system. The object of the simulation system is to provide an experimental model for the accumulation of data upon a target system. Thus, a simulation system undertakes the steps of experiment definition, modeling, computer implementation, validation and data gathering. Simulation systems are generally classified into contineous -variable models and discrete-event models.

An information retrieval system concerns itself with the structure, analysis, organization, storage, searching and dissemination of information. An information retrieval system is designed to make a given stored collection of information items available to a user. The stored information typically consists of: bibliographic items, such as books; documents; collections of drawings; films, museum artifacts; patents; and so on. An information retrieval system is designed in such a manner so as to extract the desired information item that most nearly corresponds to the request of the user.

An information retrieval system may implement an on-line operation wherein terminal devices are employed to introduce search queries and obtain retrieval output. In such a case, the information searches take place interactively in such a manner as to obtain improved search output. Moreover, information networks may be created by providing appropriate network connections. Information networks thus provide a user with the capability of accessing resources throughout the entire network.

An expert system comprises a data base of information from which responses are derived. Each response results from the forwarding of a problem or question. The expert system responds to each forwarded symptom, problem or question with a predetermined response that is located within the data base.

DIALOGUE SYSTEM INTERFACE

The present invention employs a system interface in which inquiries are formulated and through which responses from an underlying system are presented to a user. The invention employs three component windows. A question window for displaying questions for selection by a user. A response window for conveying information produced by the underlying system in response to the selected question. An object window represents a category of objects and displays the values of each object.

A sentence template contains variables which can be instantiated with values of the domain object to produce a number of expanded sentences. For example, the sentence template "So <someone><procedure>. Is that satisfactory?" can be instantiated into:

(a) "So the vice president monitors financial information. Is that satisfactory?";

(b) "So the business manager controls the outflow of funds. Is that satisfactory?"; and (c) other possible combinations.

In a preferred embodiment, sentence templates are instantiated in advance by a dialogue system. Thus, when a user selects an object value from an object window, only fully instantiated questions about the particular object appear in the question window.

In an alternate embodiment, all possible sentence templates appear in the question window. When a user selects an object value from an object window, the list of template sentences in the question window are parsed and only those questions relevant to the value are presented to the user with the instantiated value. For example, in the sentence template discussed above, if the Vice President was the selected object value for <someone>, then the sentence would be presented with So, the Vice President <procedure>. Is that satisfactory?

The present invention presents a user with a means to select a desired inquiry by topically decomposing the inquiry. First, a broad domain object, having a set of object values, is selected. Second, the user selects an object value that is desired to be the subject of the inquiry. Thereafter, the system interface displays a set of inquiries that correspond to the object value. Thus, a user is allowed to think in a topical fashion when formulating an inquiry.

Inquiry sentences are indexed for retrieval based upon the domain objects they contain. Thus, a user can rapidly reduce a large number of inquiry sentences to a more manageable number by selecting appropriate domain objects. Once a desired domain object and object value are selected, all of the inquiries relevant to the selected object value are then displayed.

Figure 2:
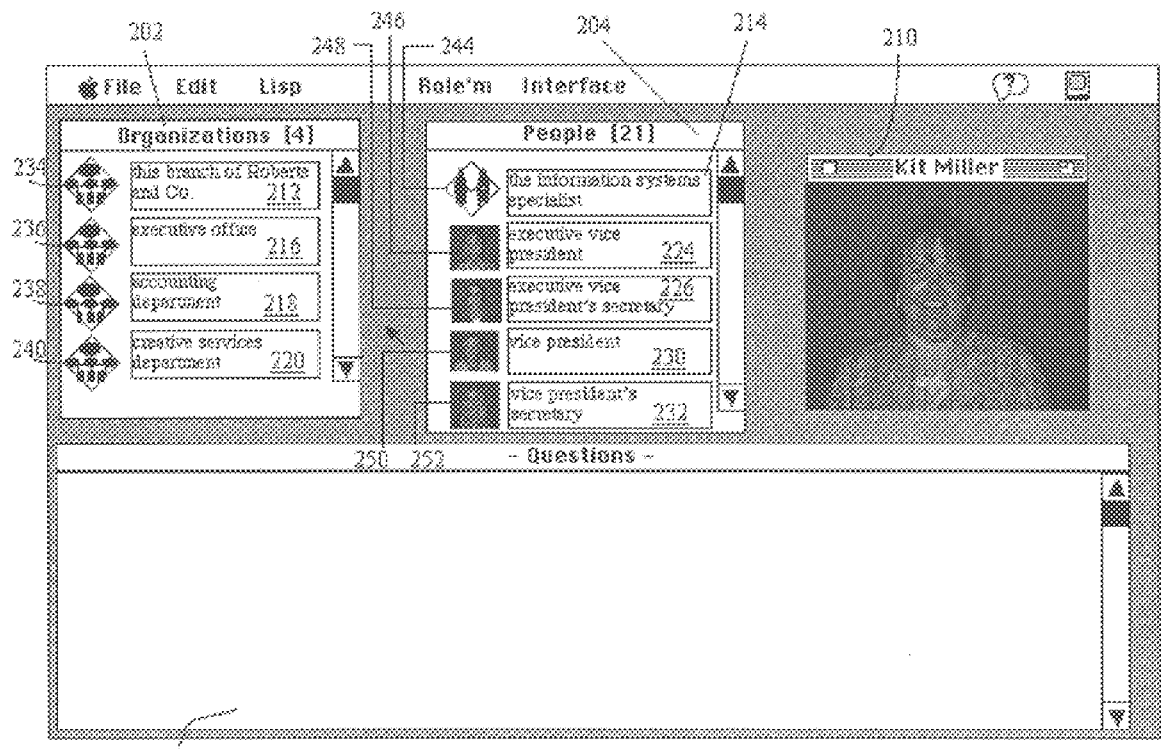
FIG. 2 illustrates an initial system interface for a simulated interview between a sales person and a potential client in accordance with the present invention.

Referring to FIG. 2, an initial screen display of the system interface for a simulated interview between a salesperson and a potential client. In this representative example, a user is a salesperson and the potential client is simulated by the underlying system. The screen display of the user interface consists of three parts: a response window 210; a questions-window 228; and two domain object windows entitled Organizations 202 and People 204.

Domain object windows 202 and 204 each contain values about which the user may inquire. The user selects an object value to initialize an inquiry by highlighting it with a single mouse click. Inquiries concerning that object value appear in the questions-window 228, thereby replacing any inquiries previously appearing in the questions-window 228.

The Organizations 202 domain object possesses four object values 212, 216, 218, and 220. These object values represent "this branch of Roberts and Co.", the "executive office", the "accounting department", and the "creative services department", respectively. The People 204 domain object possesses five object values which are referred to by reference numerals 214, 224, 226, 230 and 232. These object values represent "the information systems specialist", the "executive vice president", the "executive vice president's secretary", the "vice president", and the "vice president's secretary", respectively.

The aforementioned object values of domain objects 202 and 204 each contain a corresponding icon. Icons provide a means by which selections are made for corresponding articles. Accordingly, object values 212, 216, 218, and 220 of the Organizations 202 domain object have icons 234, 236, 238, and 240, respectively. Similarly, object values 214, 224, 226, 230 and 232 of the People 204 domain object have icons 244, 246, 248, 250, and 252., respectively.

The response window 210 provides a communication channel between the simulated person and a user. The simulated person is represented within the response window in which digital Quicktime™ movies of pre-recorded answers are shown. Each response is formed and communicated by pasting recordings of portions of responses, which are uniform for a number of similar inquiries, with recordings that are specific to the particular inquiry of the user. The pasting is performed in order to minimize the necessary recordings.

The questions-window 228 contains formulated inquiries from which the user may choose to ask of the simulated person. An inquiry may be highlighted with a single mouse click, and selected for inquiry by pressing the return key. Alternatively, the inquiry may be selected and asked in one motion by a double clicking of the mouse. Once an inquiry has been selected, the computed response is delivered through the response window 210. In applications where the answer to an inquiry does not vary as a function of the preceding inquiries and responses, the inquiries are rearranged so that those inquiries which have already been asked are removed or moved to the bottom of the set of inquiries.

Figure 3:
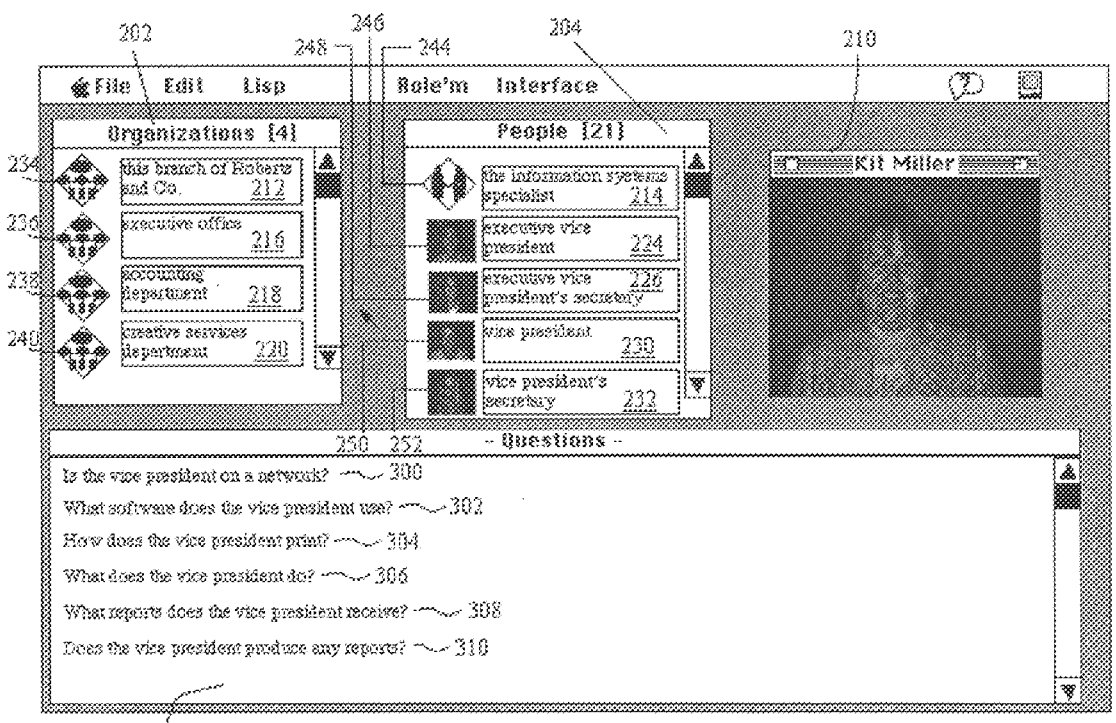
FIG. 3 illustrates the system interface upon selection of a first object value in accordance with the present invention.

Referring to FIGS. 3 through 15, a simulated interview between a sales person and a potential client is illustrated. In FIG. 3, the system interface is illustrated after selection of a first object value. The initial system interface presents two domain objects from which to choose. First, the domain object window Organizations 202 appears on the top left corner of the display. Second, the domain object window People 204 appears on the top middle portion of the display.

As indicated by its outlined perimeter, object value 230 ("vice president") is selected from the People 204 domain object window. In response to this selection, the system interface presents six inquiries regarding the vice president within the questions-window 228. The six inquiries that are presented are referred to with reference numerals 300, 302, 304, 306, 308, and 310. Any of the presented inquiries regarding the vice president may be selected. Alternatively, another object value may be selected, from either the People 204 or Organizations 202 domain object windows, to produce alternative inquiries.

Figure 4:
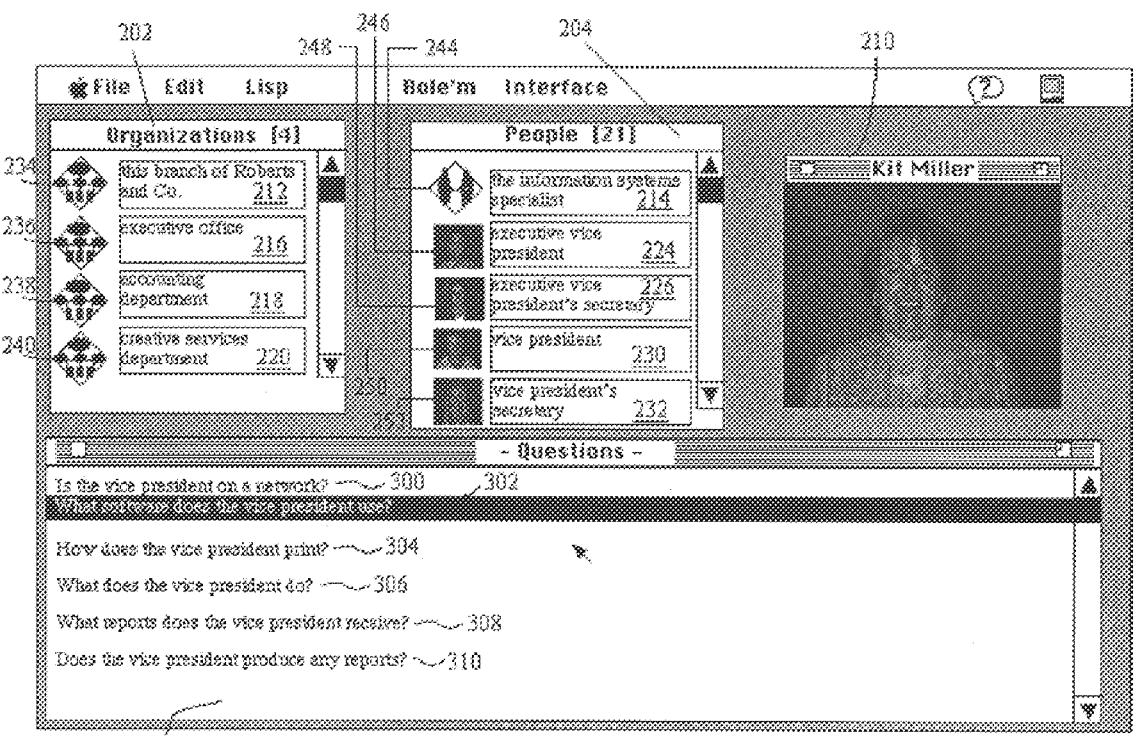
FIG. 4 illustrates the system interface upon selection of a first inquiry in accordance with the present invention.

Referring to FIG. 4, inquiry 302 ("[w]hat software does the vice president use?") is highlighted and selected for response. In reply to inquiry 302, the system interface responds as follows via the response window 210: "[s]he uses Microsoft Word, Macproject, and Powerpoint."

Figure 5:
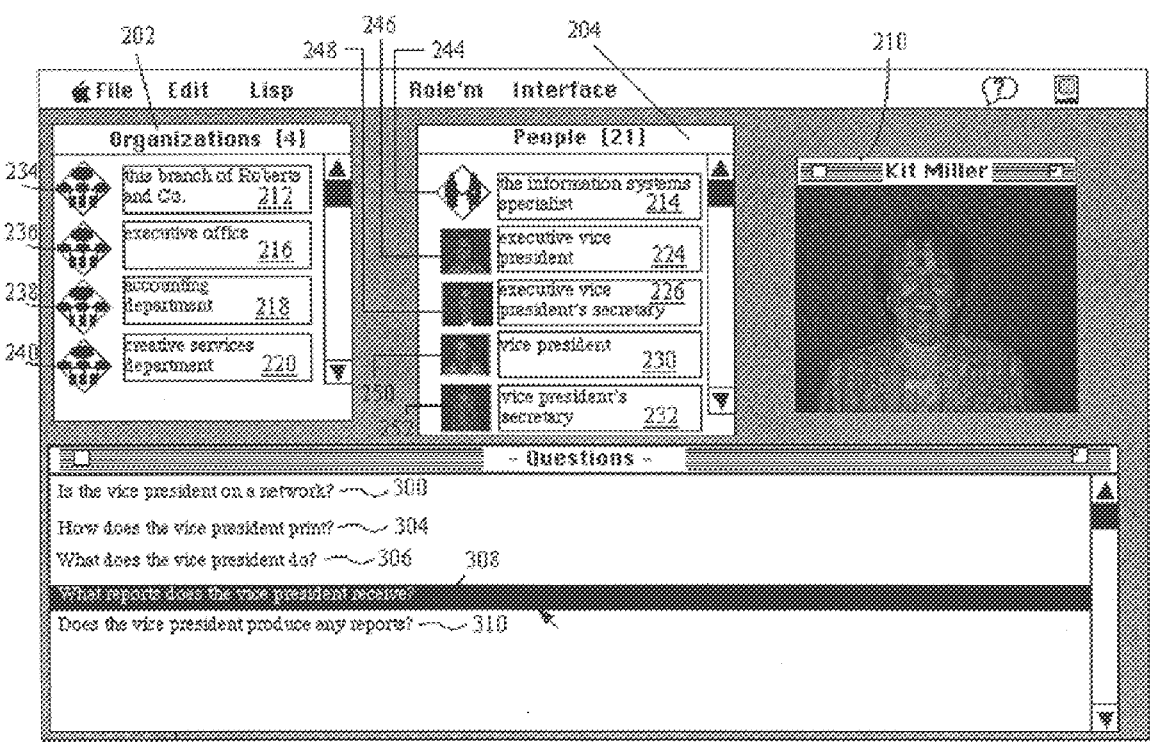
FIG. 5 illustrates the system interface after response to a first inquiry and selection of a second inquiry in accordance with the present invention.

Referring to FIG. 5, the system interface is illustrated after response to inquiry 302. The system interface removes the previously selected inquiry 302 yet retains unselected inquiries 300, 304, 306, 308, and 310 since the object value 230 ("vice president") selection has not been changed. Inquiry 308 ("[w]hat reports does the vice president receive?") is then highlighted and selected for response. In reply to inquiry 308, the system interface responds as follows via the response window 210: "[t]he monthly performance reports for the whole company, the monthly investment reports, and the monthly balance sheets."

Figure 6:
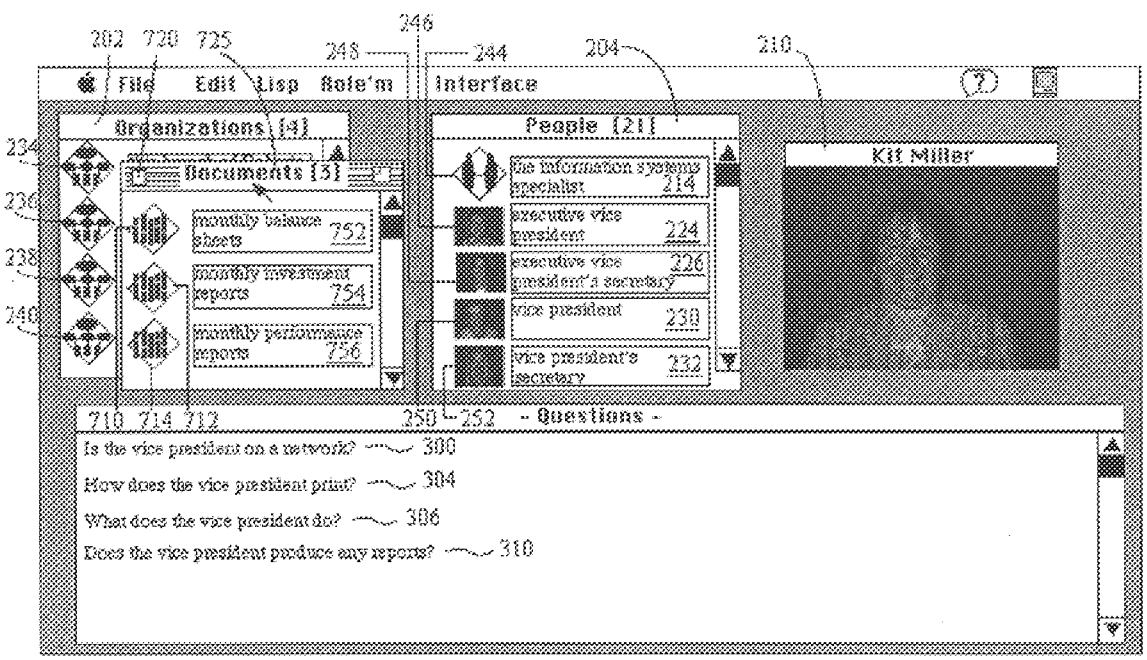
FIG. 6 illustrates the system interface after response to a second inquiry in accordance with the present invention.

Referring to FIG. 6, the system interface is illustrated after response to inquiry 308. The system interface removes the previously selected inquiry 308 yet retains unselected inquiries 300, 304, 306 and 310 since the selection of object value 230 ('vice president") has not been changed. In addition, the system interface has presented the Documents 725 domain object window, which overlays the Organizations 202 domain object window, for selection. Within the Documents 725 domain object window are object values "monthly balance sheets", "monthly investment sheets", and "monthly performance sheets", which are referred to with reference numerals 752, 754, and 756, respectively. The production of the Documents 725 domain object window and its object values follows from the response to inquiry 308 which refers to these three documents.

Figure 7:
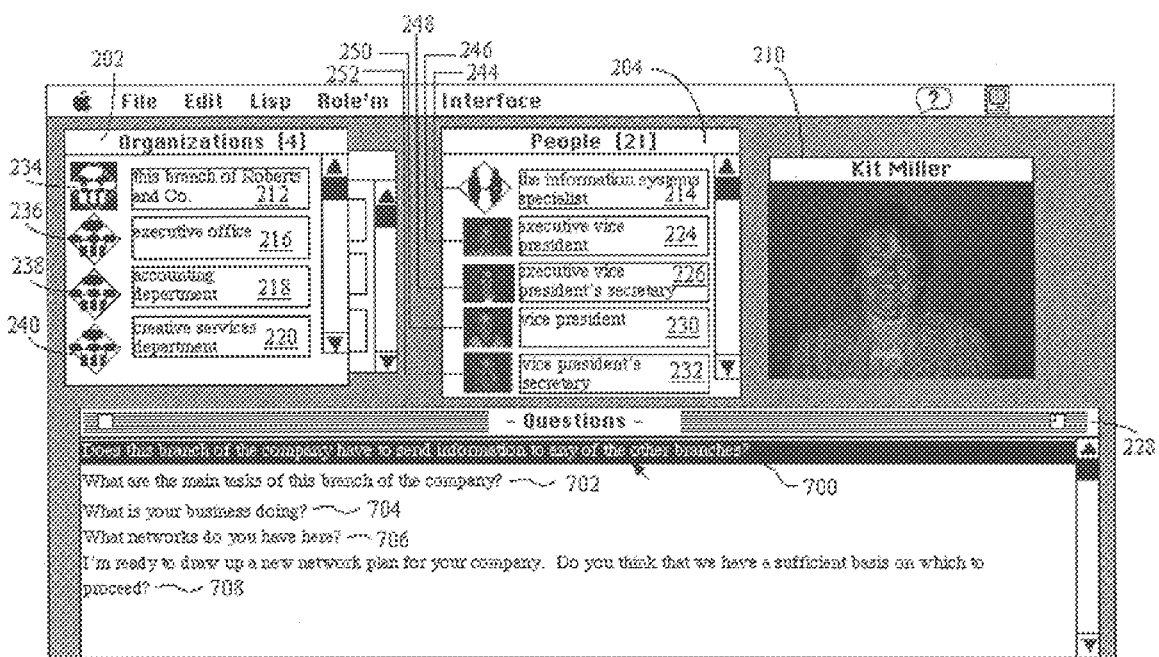
FIG. 7 illustrates the system interface upon removal of a domain object window from the system interface, selection of a new object value and selection of a third inquiry in accordance with the present invention.

Referring to FIG. 7, the system interface resulting from the removal of the Documents 725 domain objects window is illustrated. Thus, the Organizations 202 domain objects window is permitted to reappear for selection purposes. As illustrated by its outlined perimeter, object value 212 ("this branch of Roberts and Co.") is selected. Accordingly, the system interface generates inquiries that concern the branch of the vice president within the questions-window 228. Such inquiries are referred to with reference numberals 700, 702, 704, 706, and 708. Inquiry 700 ("[d]oes this branch of the company have to send information to any of the other branches?") is then highlighted and selected for response. The system interface, through the response window 210, responds to inquiry 700 as follows: "[w]e send printed summary reports to New York each week."

Figure 8:
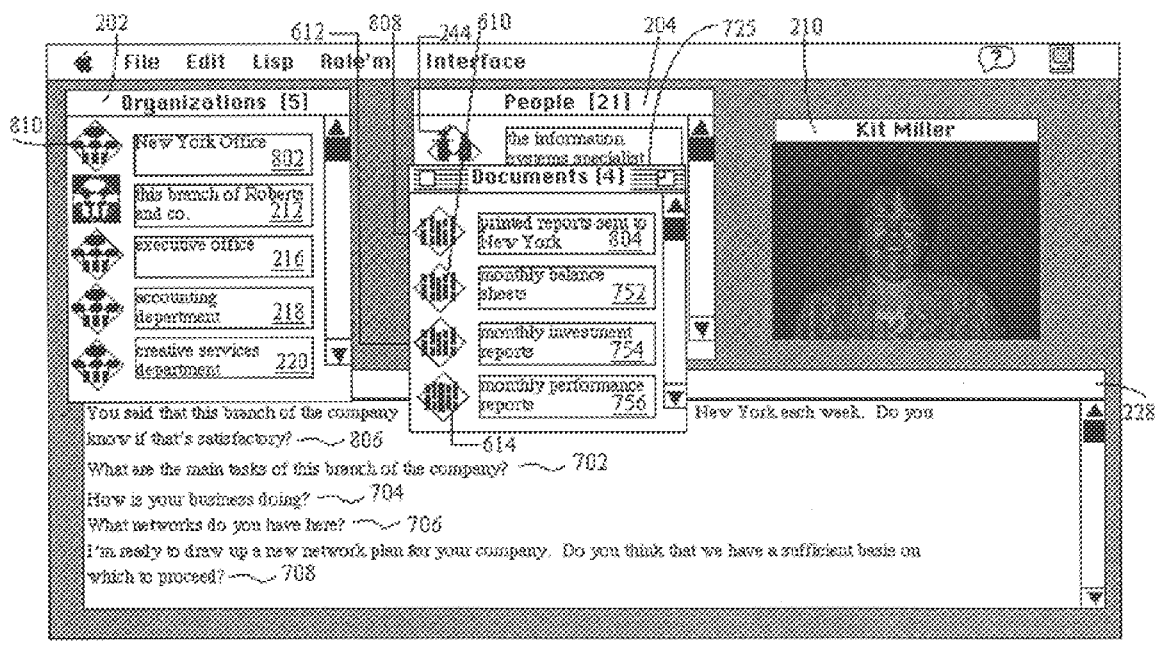
FIG. 8 illustrates the system interface after response to a third inquiry in accordance with the present invention.

Referring to FIG. 8, the system interface is illustrated after response to inquiry 700. The system interface removes the previously selected inquiry 700 yet retains unselected inquiries 702, 704, 706 and 708 since the selection of object value 212 has not been changed. The system interface also adds inquiry 806 which states: "[y]ou said that this branch of the company sends printed summary reports to New York each week. [d]o you know if that's satisfactory?". This follows from the response to inquiry 700 which refers to summary reports being sent to the New York office.

FIG. 8 also illustrates the reemergence of the Documents 725 domain object window having an additional object value as well as the addition of an object value to the Organizations 202 domain object window. Object value 802 ("New York office") with icon 810 and object value 804 ("printed reports sent to New York") with icon 808 have been produced within the Organizations 202 and Documents 725 object windows, respectively. This follows from the previous response to inquiry 700 which refers to summary reports being sent to the New York office.

Figure 9:
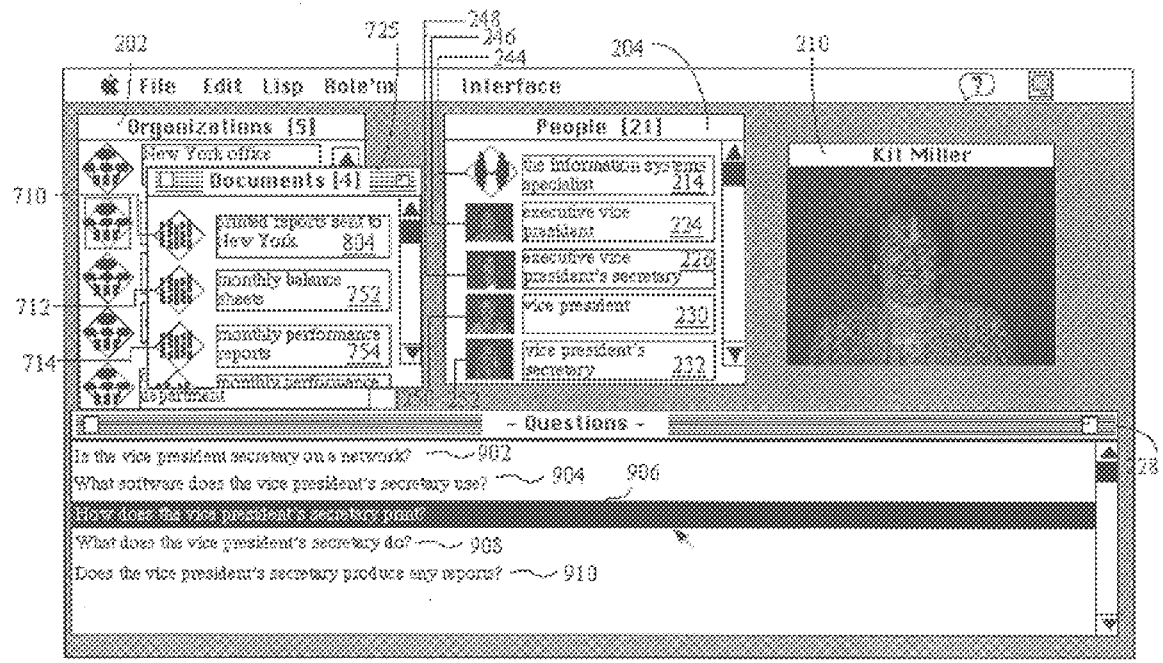
FIG. 9 illustrates the system interface upon selection of a new object value, and selection of a fourth inquiry in accordance with the present invention.

Referring to FIG. 9, object value 232 ("vice president's secretary") of the People 204 domain object window is selected. Such selection causes inquiries 902, 904, 906, 908, and 910, to be produced within the questions-window 228. Inquiry 906, which states "[h]ow does the vice president's secretary print?", is then highlighted and selected for response. The system interface, through the response window 210, responds to inquiry 906 as follows: "[s]he prints on the laserwriter attached to her machine."

Figure 10:
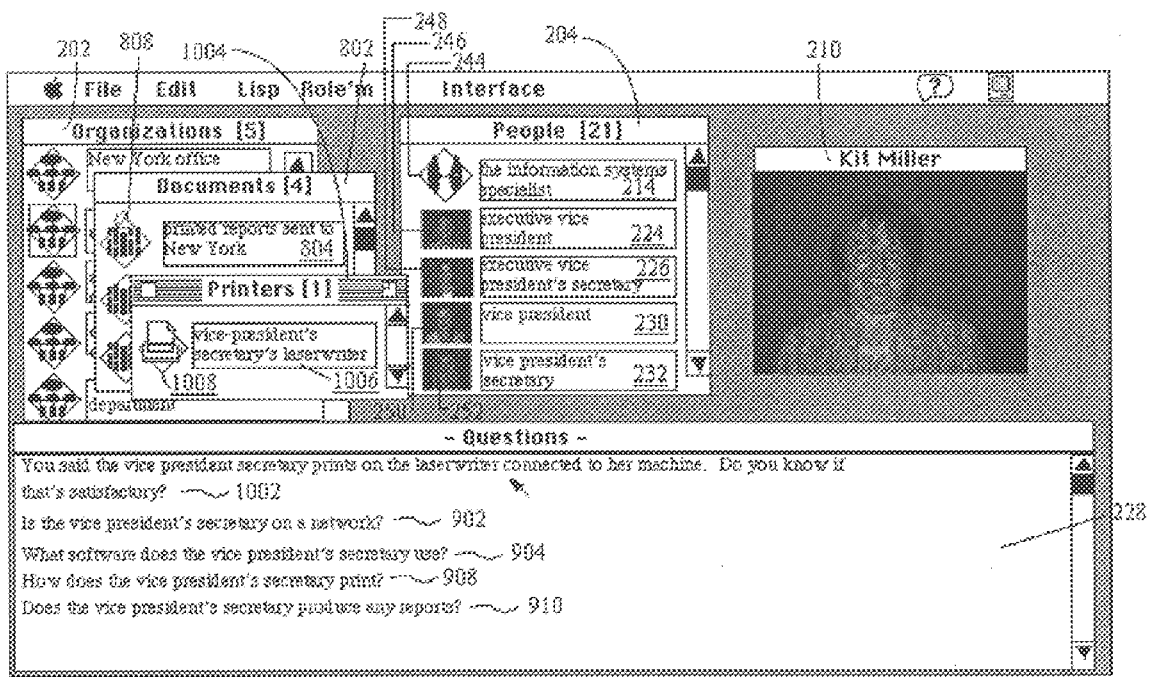
FIG. 10 illustrates the system interface after response to a fourth inquiry in accordance with the present invention.

Referring to FIG. 10, the system interface is illustrated after response to inquiry 906. The system interface removes the previously selected inquiry 906 yet retains unselected inquiries 902, 904, 908, and 910, since the selection of object value 232 ("the vice president's secretary") has not been changed. In addition, the system interface has added inquiry 1002 which states "[y]ou said that the vice president's secretary prints on the laserwriter connected to her machine. [d]o you know if that's satisfactory?" to the questions-window 228. This addition represents the growth of knowledge in the user with respect to the vice president's secretary's use of a laserwriter. Furthermore, an object window entitled Printers 1004 with object value 1006 ("vice president's secretary's laserwriter") and corresponding icon 1008 is presented.

Figure 11:
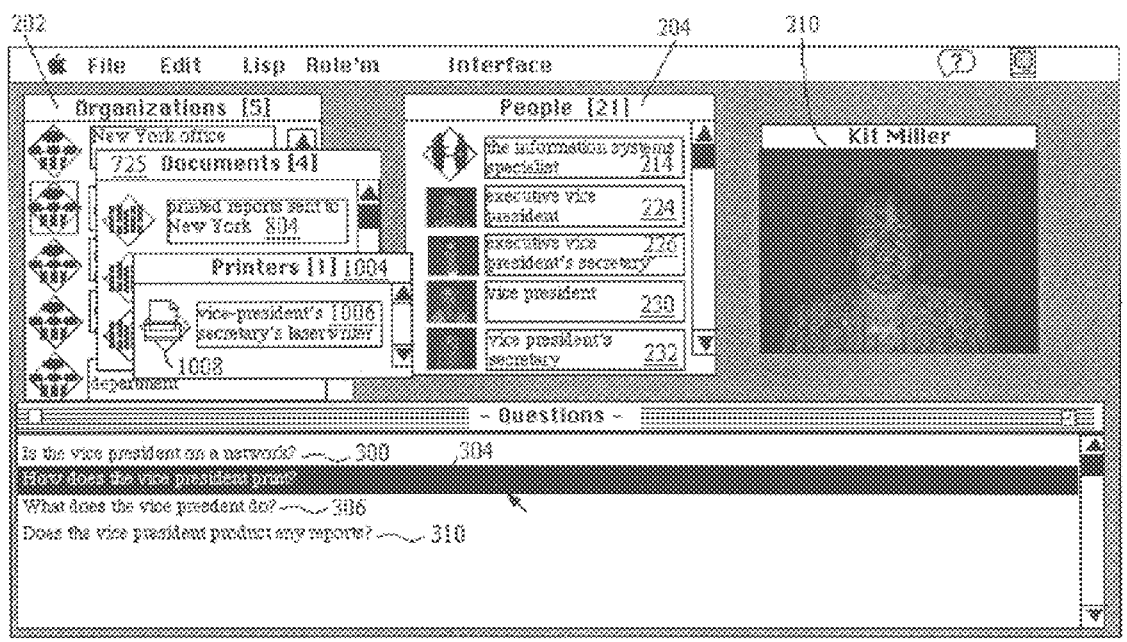
FIG. 11 illustrates the system interface upon selection of a new object value, and selection of a fifth inquiry in accordance with the present invention.

Referring to FIG. 11, object value 230 ("the vice president") is selected. Accordingly, questions regarding the vice president are produced within the questions-window 228. Thereafter, inquiry 304, which states "[h]ow does the vice president print?", is highlighted and selected for response. In reply to inquiry 304, the system interface responds as follows via the response window 210: "[s]he passes disks to her secretary who prints documents on the laserwriter attached to her machine."

Figure 12:
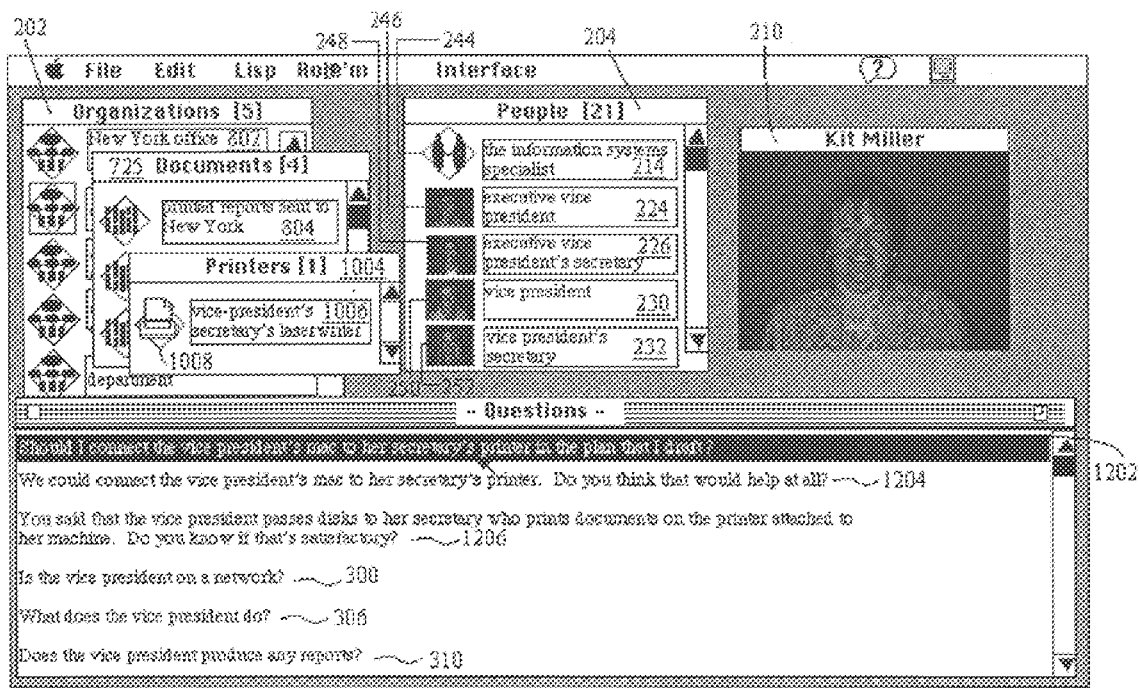
FIG. 12 illustrates the system interface after response to a fifth inquiry and upon selection of a sixth inquiry in accordance with the present invention.

Referring to FIG. 12, the system interface is illustrated after response to inquiry 304. The system interface removes the previously selected inquiry 304 yet retains unselected inquiries 300, 306, and 310 since the selection of object value 230 ("the vice president") has not been changed. In addition, the system interface has added inquiries 1202 ("[s]hould I connect the vice president's mac to her secretary's printer in the plan that I draw up?"), 1204 ("[w]e could connect the vice president's mac to her secretary's printer. [d]o you think that would help at all?"), and 1206 ("you said that the vice president passes disks S to her secretary who prints documents on the printer attached to her machine. [d]o you know if that's satisfactory?") to the questions-window 228. Inquiry 1202 is thereafter highlighted and selected for response. In reply to inquiry 1202, the system interface responds as follows via the response window 210: "[y]es I think so."

Figure 13:
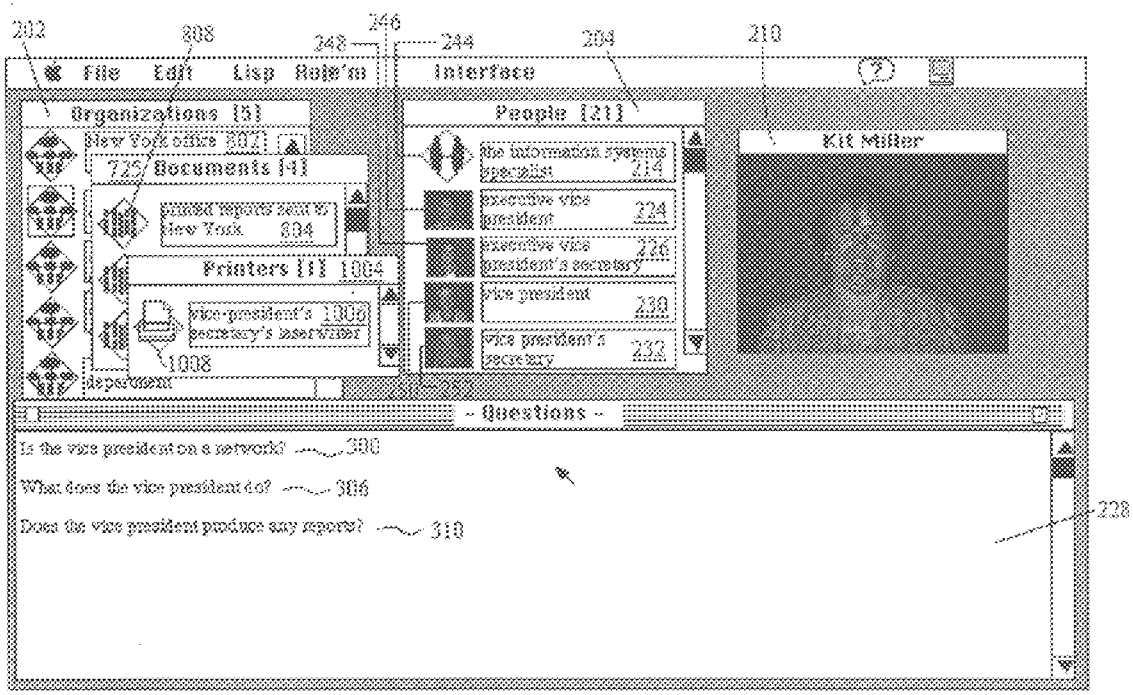
FIG. 13 illustrates the system interface after response to a fourth inquiry in accordance with the present invention.

Referring to FIG. 13, the system interface is illustrated after response to inquiry 1202. It should be noted that inquiries 1204 and 1206, which were generated in response to the fifth inquiry yet not selected, have been removed from the questions-window 228. This results since inquiries 1204 and 1206 would not be proper in light of the response of the system interface to inquiry 1202.

Figure 14:
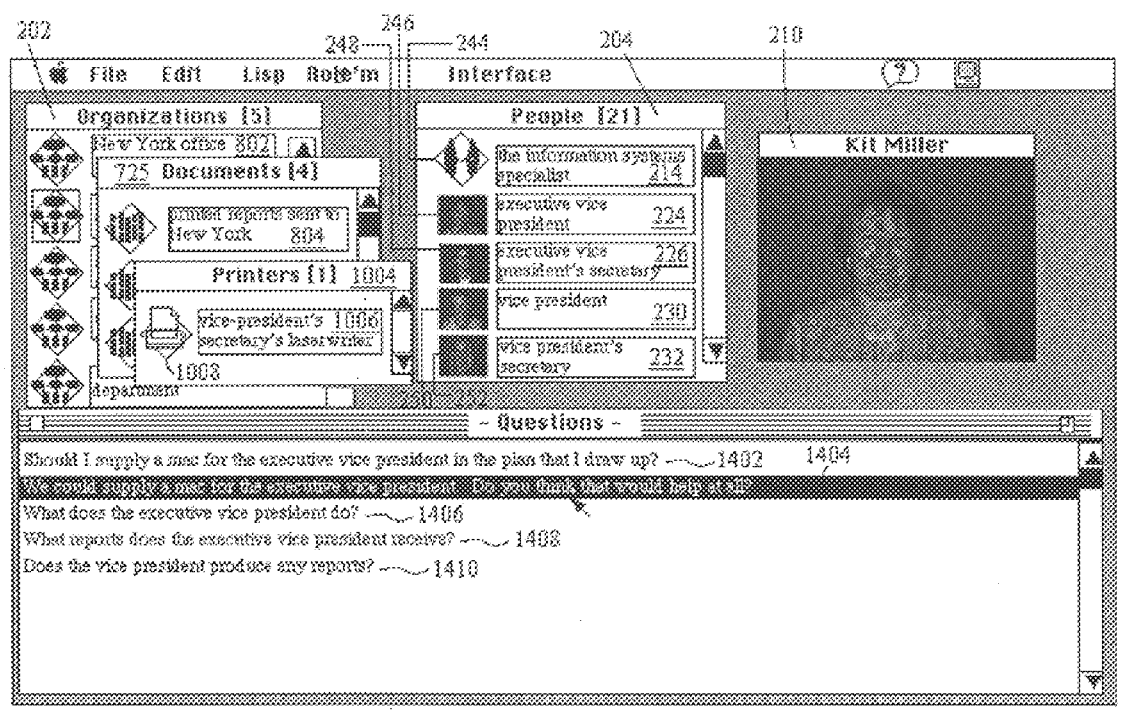
FIG. 14 illustrates the system interface upon selection of a new object value, and selection of a seventh inquiry in accordance with the present invention.

Referring to FIG. 14, object value 224 ("executive vice president") is selected. Accordingly, inquiries regarding the executive vice president are produced within the questions-window 228. Such inquiries are referred to with reference numerals 1402,1404,1406,1408, and 1410. Thereafter, inquiry 1404 ("[w]e could supply a mac for the executive vice president. [d]o you think that would help at all?") is highlighted and selected for response. In reply to inquiry 1404, the system interface responds as follows via the response window 210: "[i]t's too expensive for the advantages that it offers."

Figure 15:
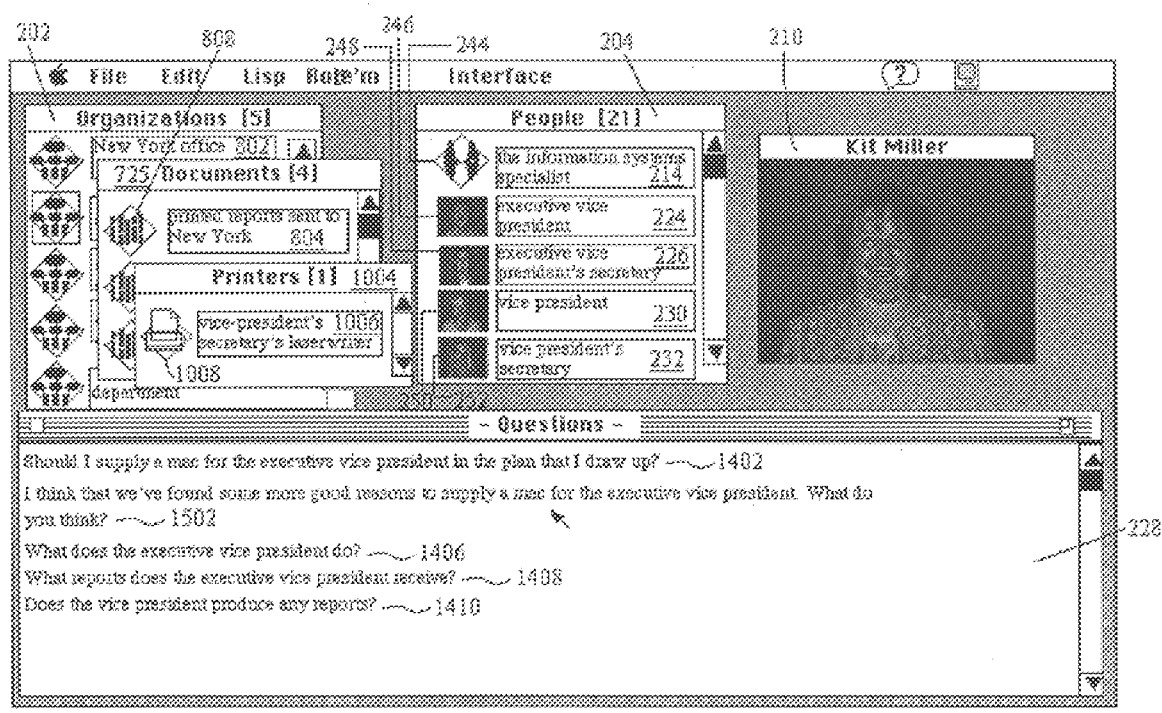
FIG. 15 illustrates the system interface after response to a seventh inquiry in accordance with the present invention.

Referring to FIG. 15, the system interface is illustrated after response to inquiry 1404. The system interface removes the previously selected inquiry 1404 and replaces it with inquiry 1502 which states "[i] think that we've found some more good reasons to supply a mac for the executive vice president, [w]hat do you think?". Inquiry 1502 allows the user to again forward inquiry 1404, while taking into account its former objection, at a later time when the user feels that the simulated person may change her response.

KNOWLEDGE BASES OF THE COMPOSITE SYSTEM

Object values each contain a number of slots. A slot is a memory item which contains a particular value. Every object value has a slot for each of three possible textual descriptions. The three textual descriptions are: (i) the simulation-description slot whose value is used in answers given by the simulated person; (ii) the user-description slot whose value is used in questions available to the user; and (iii) the icon-description slot, the value for which appears beside the icon that represents the object value. If the user-description slot is empty, its value defaults to that of the simulation-description. Similarly, if the icon-description slot is empty, its value defaults to that of the user-description.

For example, if the object value were the information systems specialist, each textual description would contain its own value. Specifically, the icon-description would simply be "information systems specialist." In contrast, the simulated-description would be "me" whereas the user-description would be "you."

An example of an instance in which a default occurs is when the object value is simply a thing. For example, if the simulation-description is "the third floor network," both the user-description and the icon-description default their values to the value of the simulation description.

Figure 16:
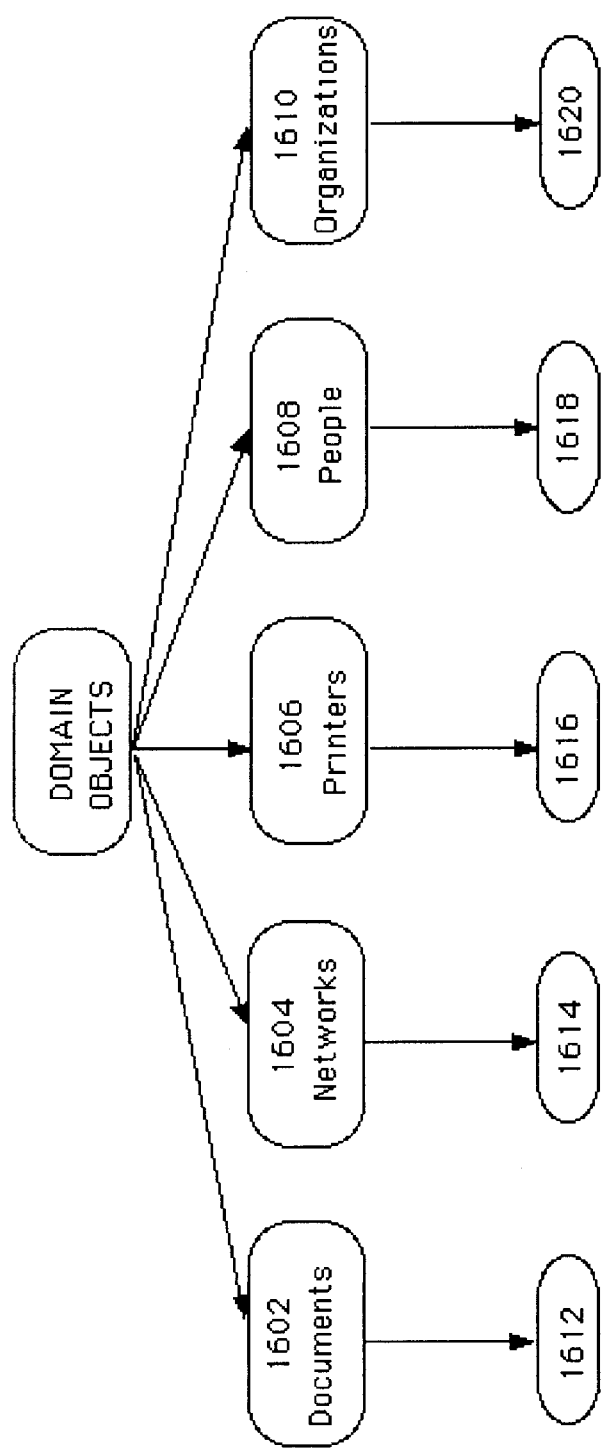
FIG. 16 illustrates a hierarchy flowchart of a simulation knowledge base of a system interface for a simulated interview between a sales person and a potential client in accordance with the present invention.

The present invention requires a knowledge base modeling the structure of the domain. Referring to FIG. 16, a hierarchy for a knowledge base for a simulated sales interview between a sales person and a potential client is illustrated. As illustrated by FIG. 16, there are five domain objects at the first level of the hierarchy. Namely, the domain objects are Documents, Networks, Printers, People and Organizations, which are referred to with reference numerals 1602, 1604, 1606, 1608, and 1610, respectively. Each of these domain objects further contains a set of corresponding object values. Accordingly, domain objects Documents 1602, Networks 1604, Printers 1606, People 1608 and Organizations 1610, have object value sets 1612, 1614,1616, 1618 and 1620, respectively. For example, a document can contain values including "ledger sheets" and "daily job cost reports".

When the composite system is initialized, the knowledge base contains information which the user is familiar with. That information defines a set of objects and object values that are initially displayed to the user in the dialogue system. As the alternate system responds to an inquiry of a user, the knowledge base is expanded with the acquired information. This expanded information is conveyed to the user via additional objects.

DIALOGUE SYSTEM INTERFACE OPERATION

Figure 17:
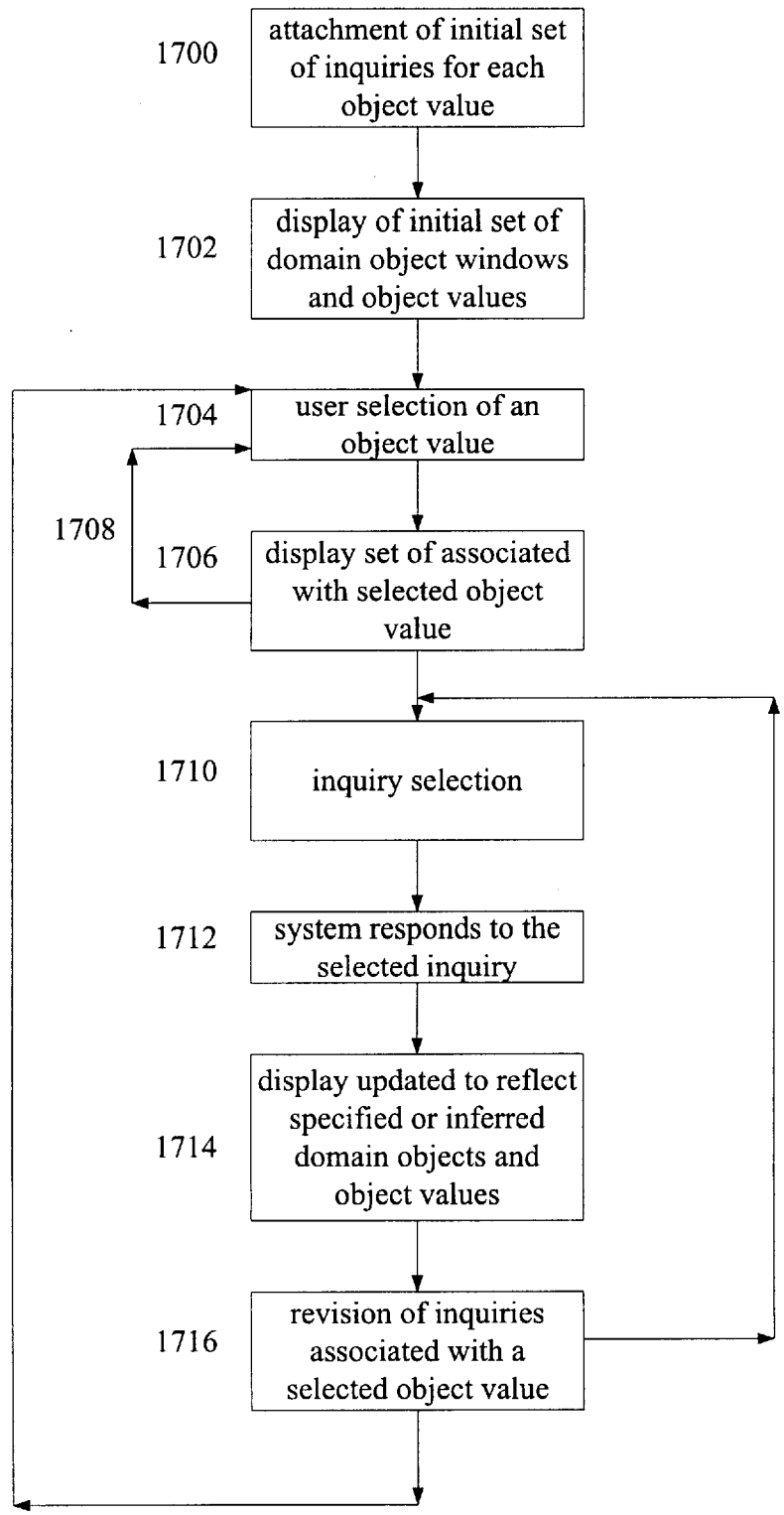
FIG. 17 illustrates a flowchart depicting the operation of the system interface in accordance with the present invention.

Referring to FIG. 17, a flowchart depicting the operation of the system interface is illustrated.

First, the system interface attaches an initial set of inquiries for each object value as indicated by block 1700. Second, the interface system displays an initial set of domain object windows and object values, a blank questions window and an initialized response window. This is indicated by block 1702. Thereafter, the user selects a particular object value as denoted by block 1704. Once the user has made this selection, the system interface instantiates the template corresponding to the domain object and the inquiries attached to that particular object value. This is denoted by block 1706. If the user is dissatisfied with the inquiries proffered by the system interface, block 1704 may be revisited until the desired inquiries corresponding to a particular object value are advanced. This is indicated by logic flow path 1708.

Upon advancement of a desired inquiry, the inquiry is selected and submitted to the underlying system for response as indicated by block 1710. The underlying system delivers the response associated with the inquiry via the response window 210. As an additional response to the inquiry, the system interface is updated so as to display specified domain objects and object values that are referred to or inferred from the response. In further response to the submitted inquiry, the system interface revises the set of inquiries associated with the selected object value by utilizing specified procedures. The aforementioned system interface responses to the submitted inquiry are referred to within FIG. 17 by reference numerals 1712, 1714, and 1716, respectively.

Subsequent to the system response to the submitted inquiry, the user may: (i) select another object value from which diverse inquiries will be displayed and control is passed to block 1704; or (ii) select an inquiry from the updated set of inquiries for the object value previously selected, and control is returned to function block 1710.

Figure 18:
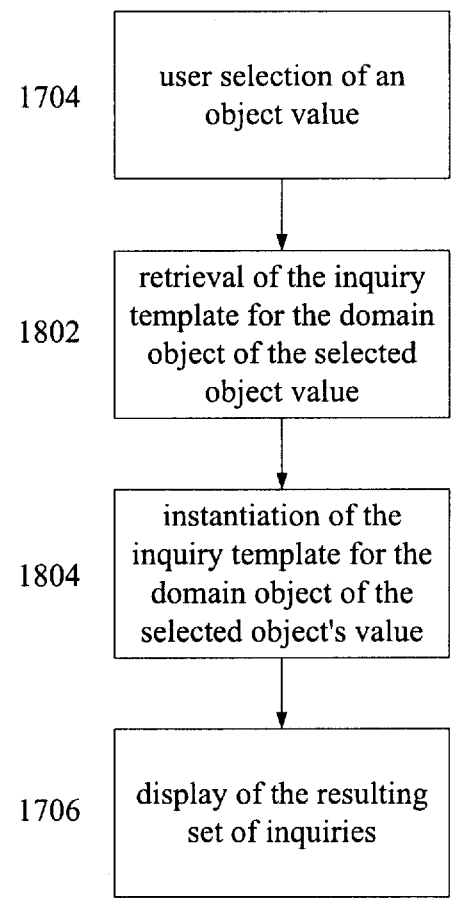
FIG. 18 illustrates a flowchart depicting the operation of the system interface in formulating and displaying inquiries from a selected object value.

Referring to FIG. 18, a flowchart depicting the operation of the system interface in formulating and displaying inquiries from a selected object value is illustrated. Upon user selection of a particular object value, as indicated by block 1704, the inquiry template for the domain object of the particular object value is retrieved. This is indicated by block 1802. Thereafter, the retrieved inquiry template is instantiated with the particular object value as indicated by block 1802. Consequently, a resulting set of inquiries is displayed as indicated by block 1706.

Once an inquiry has been selected, the inquiry is processed. Processing the inquiry causes an action associated with the inquiry to be executed. Such action may cause the user-knowledge base to be updated, and therefore present more domain objects and object values on the interface to be used in future inquiries.

The system records the objects in the domain about which the user has been made aware of by the system responses. Each object value that is introduced by a response is represented by an icon in the appropriate domain object window. In addition, the system also predicts object values that should be inferred from each response and introduces such object values onto the interface.

The mechanism by which an object value is inferred utilizes slots that pertain to each object value. Every object value has a slot which lists other object values which can be directly inferred from it. Consequently, all object values which are slotted as being inferable from an object value included within a response, are introduced for selection. For example, after the inquiry, "who prepares the report on locally controlled investments?" and the response "the business manager's assistant" a new object value of "business manager's assistant" is presented. However, the system also expects the user to infer that there is a "business manager." Consequently, an icon for the object value of "business manager" will be presented.

After each response, the inference mechanism collects all the object values referred to within the response as well as all the objects which can be inferred from them. Any collected object values, which do not have corresponding domain object windows that are already displayed upon the system interface, are inserted upon the system interface within their corresponding domain object window.

Any collected object values, which have corresponding domain object windows that are already displayed upon the system interface, are inserted within their corresponding domain object window.

While the invention has been described in terms of a preferred embodiment in a specific system environment, those skilled in the art recognize that the invention can be practiced, with modification, in other and different hardware and software environments within the spirit and scope of the appended claims.

Having thus described our invention, what we claim as new, and desire to secure by letters patent is:

1. In a computer system, a method for enhancing a user interface with a computer based training tool, comprising the steps of:

listing domain objects on a display;

listing domain object values on the display, in response to a selection of one of the domain objects;

generating a plurality of inquiries on the display in response to a user selection of one of the domain object values, each of which is instantiated with the selected domain object value;

replying with a predetermined answer, in response to a user selection of one of the inquiries;

removing the selected inquiry from the plurality of inquiries on the display after the replying step;

retaining on the display a remaining set of inquiries equivalent to the plurality of the inquiries minus the selected inquiry;

identifying a new domain object value in the predetermined answer; and adding to the plurality of inquiries a new inquiry which incorporates both the selected domain object value and the new domain object value.

2. A computer system for enhancing a user interface with a computer based training tool, comprising:

means for listing domain objects on a display;

means for listing domain object values on the display, in response to a selection of one of the domain objects;

means for generating a plurality of inquiries on the display, in response to a user selection of one of the domain object values, each of which is instantiated with the selected domain object value;

means for replying with a predetermined answer, in response to a user selection of one of the inquiries;

means for removing the selected inquiry from the plurality of inquiries on the display after replying with the predetermined answer;

means for retaining on the display a remaining set of inquiries equivalent to the plurality of the inquiries minus the selected inquiry;

means for identifying a new domain object value in the predetermined answer; and means for adding a new inquiry to the plurality of inquiries, wherein the new inquiry incorporates both the selected domain object value and the new domain object value.

3. In a computer system, a method for enhancing a user interface with a computer based training tool, comprising the steps of:

listing domain objects on a display;

listing domain object values on the display, in response to and derived from a selection of one of the domain objects;

generating a plurality of inquiries on the display, in response to and derived from a user selection of one of the domain object values, each of which is instantiated with the selected domain object value;

replying with a predetermined answer, in response to a user selection of one of the inquiries;

identifying a new domain object value in the predetermined answer;

adding to the domain objects a new domain object associated with a new domain object value; and adding to the plurality of inquiries a new inquiry which incorporates both the selected domain object value and the new domain object value.

* * * * *